(12) United States Patent
Guerra et al.

(10) Patent No.: US 6,396,789 B1
(45) Date of Patent: May 28, 2002

(54) DATA STORAGE SYSTEM AND METHODS USING DIFFRACTIVE NEAR-FIELD OPTICS

(75) Inventors: John M. Guerra, Concord; Patricia A. Mokry Kendra, Watertown, both of MA (US)

(73) Assignee: Calimetrics, Inc., Alameda, CA (US)

( * ) Notice: Subject to any disclaimer, the term of this patent is extended or adjusted under 35 U.S.C. 154(b) by 0 days.

(21) Appl. No.: 09/032,322

(22) Filed: Feb. 27, 1998

(51) Int. Cl.⁷ .................................................. G11B 7/00
(52) U.S. Cl. .............. 369/112; 369/112.04; 369/112.12
(58) Field of Search ............................... 369/112, 275.1, 369/116, 109, 44.23, 13, 103, 34, 126, 112.04, 112.06, 112.07, 112.08, 112.05, 122.23; 264/1.31, 1.36; 428/30, 67

(56) References Cited

U.S. PATENT DOCUMENTS

| 4,843,494 A | | 6/1989 | Cronin et al. ............. 360/77.03 |
| 5,349,443 A | | 9/1994 | Guerra ........................ 356/376 |
| 5,497,359 A | * | 3/1996 | Mamin et al. .............. 369/112 |
| 5,538,674 A | * | 7/1996 | Nisper et al. .............. 264/1.31 |
| 5,734,632 A | * | 3/1998 | Ito et al. ................... 369/44.23 |
| 5,910,940 A | * | 6/1999 | Guerra ........................ 369/116 |
| 5,946,281 A | * | 8/1999 | Ito et al. .................... 369/112 |
| 5,978,139 A | * | 11/1999 | Hatakoshi et al. .......... 369/112 |

FOREIGN PATENT DOCUMENTS

| EP | 0 814 468 A1 | 3/1995 |
| EP | 0 688 014 A1 | 4/1995 |
| EP | 0 871 163 A3 | 10/1998 |
| JP | 05 034129 A | 2/1993 |
| JP | 07 093797 A | 9/1993 |
| WO | WO 98/58370 | 12/1998 |

OTHER PUBLICATIONS

Guerra, John M., "Super–resolution through illumination by difraction–born evanescent waves," Jun. 26, 1995, American Institute of Physics, p. 3555–3557.

* cited by examiner

Primary Examiner—David Hudspeth
Assistant Examiner—Kim-Kwok Chu
(74) Attorney, Agent, or Firm—Van Pelt & Yi LLP (57) ABSTRACT

An optical assembly suitable for use with an optical medium for the storage and retrieval of data, the optical assembly comprising: a source of illumination for providing a beam of optical radiation, an objective lens disposed in the optical path of the beam for redirecting the beam to the optical medium, and a diffractive optical element disposed between the redirected beam of radiation and the optical medium such that at least a portion of the redirected beam of radiation passes through a surface of the diffractive optical element and is reflected to the objective lens.

12 Claims, 14 Drawing Sheets

DATA STORAGE SYSTEM AND METHODS USING DIFFRACTIVE NEAR-FIELD OPTICS

BACKGROUND OF THE INVENTION

1. Field of the Invention

This invention in general relates to the field of data storage and retreival, including recording and micro-lithography, and in particular to data storage and retrieval systems incorporating flying diffractive near-field optical elements.

2. Description of the Prior Art

Guerra and Plummer in 1987 first described and broadly claimed the application of evanescent field, now sometimes known as near-field, optics to a flying head, with the head flying in proximity to a rotating data storage media. Total internal reflection (TIR) of light within a transparent body results in an evanescent field leaking beyond the body. The light and TIR are frustrated when another body is brought within the decaying evanescent field, as first demonstrated by Newton in the 1600's and studied by hundreds of researchers over the years, up to this day. Images of the optical data in a compact disc obtained with the evanescent field from an Amici sphere are shown and described by Guerra in 1988. The effective numerical aperture NA can be greater than 1, and resolution increases accordingly as the wavelength λ/2NA, the spot size of the writing laser decreases, and the storage density increases as the square of the ratio of the new NA as increased by the Amici sphere and the original NA of the existing objective lens.

Kino and Mansfield in 1991 dislcose a solid immersion optical microscope, and together with Corle a lithography system employing a solid immersion lens (SIL), and an optical recording system employing a solid immersion lens. Similarly, Mamin, Rugar, and Terris describe a SIL built into a slider for optical data storage (1996). The SIL is an aplanatic hemisphere or hyper-hemisphere illuminated such that some of the light is totally internally reflected, and an evanescent or near-field is created.

It will be recognized by those even casually skilled in the art that the use of such near-hemispheres, hemispheres, and hyper-hemispheres placed close to the object to increase the numerical aperture of an optical system, whether with near-field illumination or propagating illumination, is inherent to every microscope objective design since Abbe invented the homogenous immersion objective in 1878.

As disclosed in this specification, the advantages of diffractive optical elements (which includes by definition Fresnel optics) over their optical refractive counterpart are brought to bear on the construction and application of high numerical aperture and near-field optical microscope devices in the fields of micro-lithography, and in particular to optical data storage. (Optical here is meant to include the full electro-magnetic spectrum, such as microwaves or the far infra-red, for example.)

While the art describes a variety of recording media, there remains a need for improvements that offer advantages and capabilities not found in presently available instruments, and it is a primary object of this invention to provide such improvements.

It is another object of the invention to provide for a method of reading and writing utilizing evanescent field resolution.

Other objects of the invention will be obvious, in part, and, in part, will become apparent when reading the detailed description to follow.

SUMMARY OF THE INVENTION

The present invention discloses an optical assembly suitable for use with an optical medium for the storage and retrieval of data. The optical assembly comprises a source of illumination for providing a beam of optical radiation, an objective lens disposed in the optical path of the beam for redirecting the beam to the optical medium, and a diffractive optical element disposed between the redirected beam of radiation and the optical medium such that at least a portion of the redirected beam of radiation passes through a surface of the diffractive optical element and is reflected to the objective lens. Other features of the invention will be readily apparent when the following detailed description is read in connection with the drawings.

BRIEF DESCRIPTION OF THE DRAWINGS

The structure and operation of the invention, together with other objects and advantages thereof, may best be understood by reading the detailed description to follow in connection with the drawings in which unique reference numerals have been used throughout for each part and wherein.

DESCRIPTION OF THE PREFERRED EMBODIMENTS

Background

Figure 1:
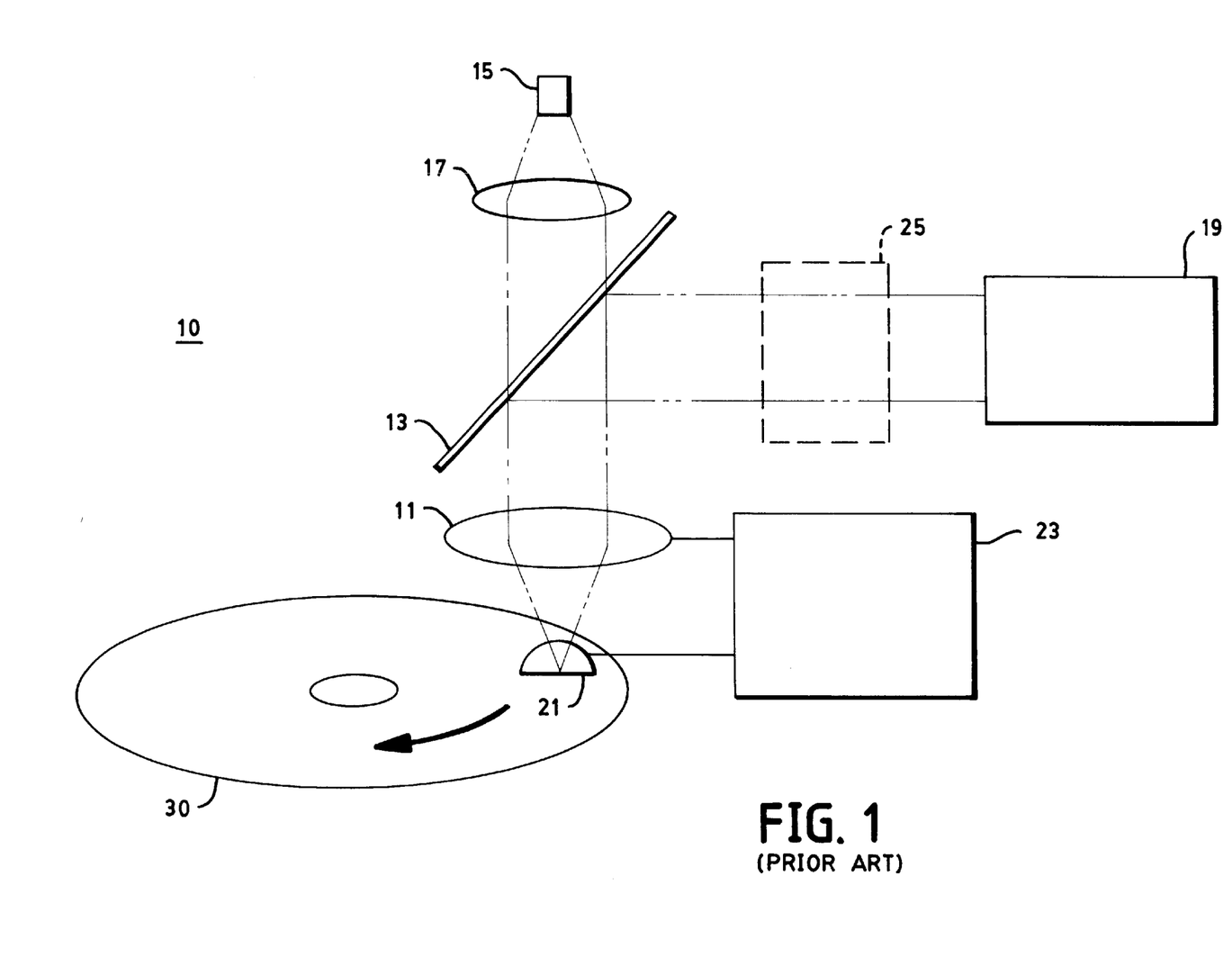
FIG. 1 is a diagrammatic partially elevational and partially perspective view of a conventional optical data storage and retrieval system with an aplanatic sphere positioned adjacent an optical storage medium.

There is shown in FIG. 1 a conventional optical data storage and retrieval system 10 used with an optical storage medium 30, such as a CD-ROM. System 10 comprises an objective lens 11, a beam-splitter 13, a detector 15 such as a photodiode, a focusing lens 17, and a source of illumination 19 such as a laser device. System 10 also comprises an aplanatic hemisphere 21 where objective lens 11 and hemisphere 21 are controlled by means of a servo system 23. Alternatively, a modulator 25 may be used in conjunction with illumination source 19. During the process of storing or retrieving data, optical storage medium 30 is moved relative to hemisphere 21 as indicated by the arrow, and data, comprising surface pits or other artifacts, is read from or written to optical storage medium 30.

Figure 2:
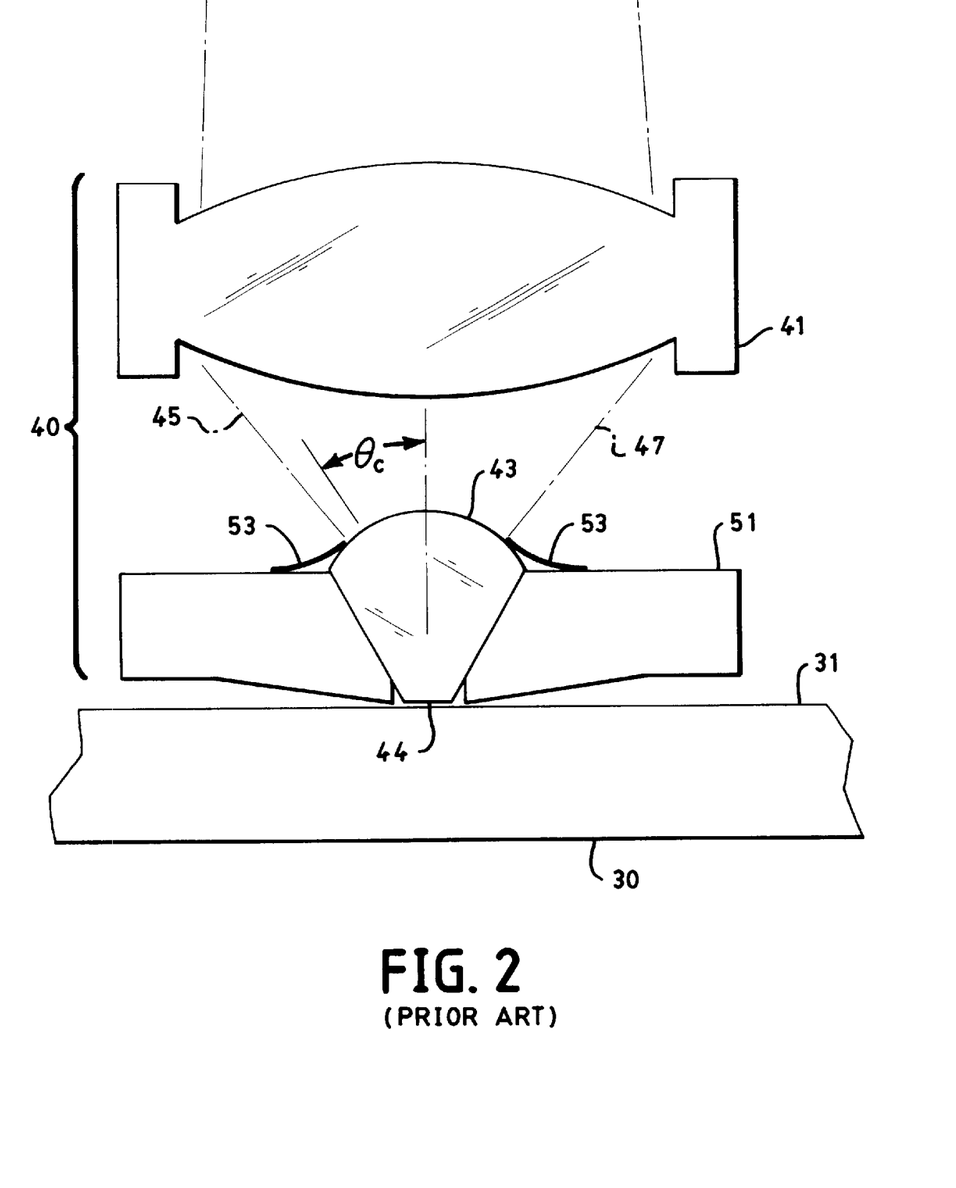
FIG. 2 is a diagrammatic view of the objective lens and a solid immersion lens of a conventional optical data storage and retrieval system.

In another prior-art system, shown in FIG. 2, data from optical storage medium 30 is accessed by a conventional optical system 40 comprising an objective lens 41, such as a Digital Versatile Disc (DVD) lens, and a solid immersion lens 43. Illumination 45 enters solid immersion lens 43 at an angle greater than the critical angle $\theta_C$ and is totally internally reflected from a reflection surface 44 as reflected radiation 47. Solid immersion lens 43 is retained in position above a medium surface 31 of optical storage medium 30 by means of a supporting structure 51 and is held in place by an elastic member 53.

Steeply curved optics such as aplanatic hemisphere 21 and solid immersion lens 43 are typically produced individually and, as such, are expensive to manufacture. Moreover, the curvatures of the optical surfaces are held to relatively tight tolerances so as to minimize aberrations. In an effort to reduce the costs of producing such optics, a glass molding or pressing process or a sol-gel technique may be used. However, it still remains difficult to control the quality of the optical surface because of the large shrinkage involved. Plastic molding is possible, but the refractive indices of plastic materials remain low and little is gained in resolution and data density. Further, tribology considerations require that the plastic element be coated with a wear-resistant film, such as diamond-like carbon film, an additional feature which results in an increased fabrication cost. Unfortunately, such coatings are not known for reliability in use, as they are susceptible to delamination and cracking due to generally difficult adhesion to polymers.

Description of the Preferred Embodiments

Figure 3:
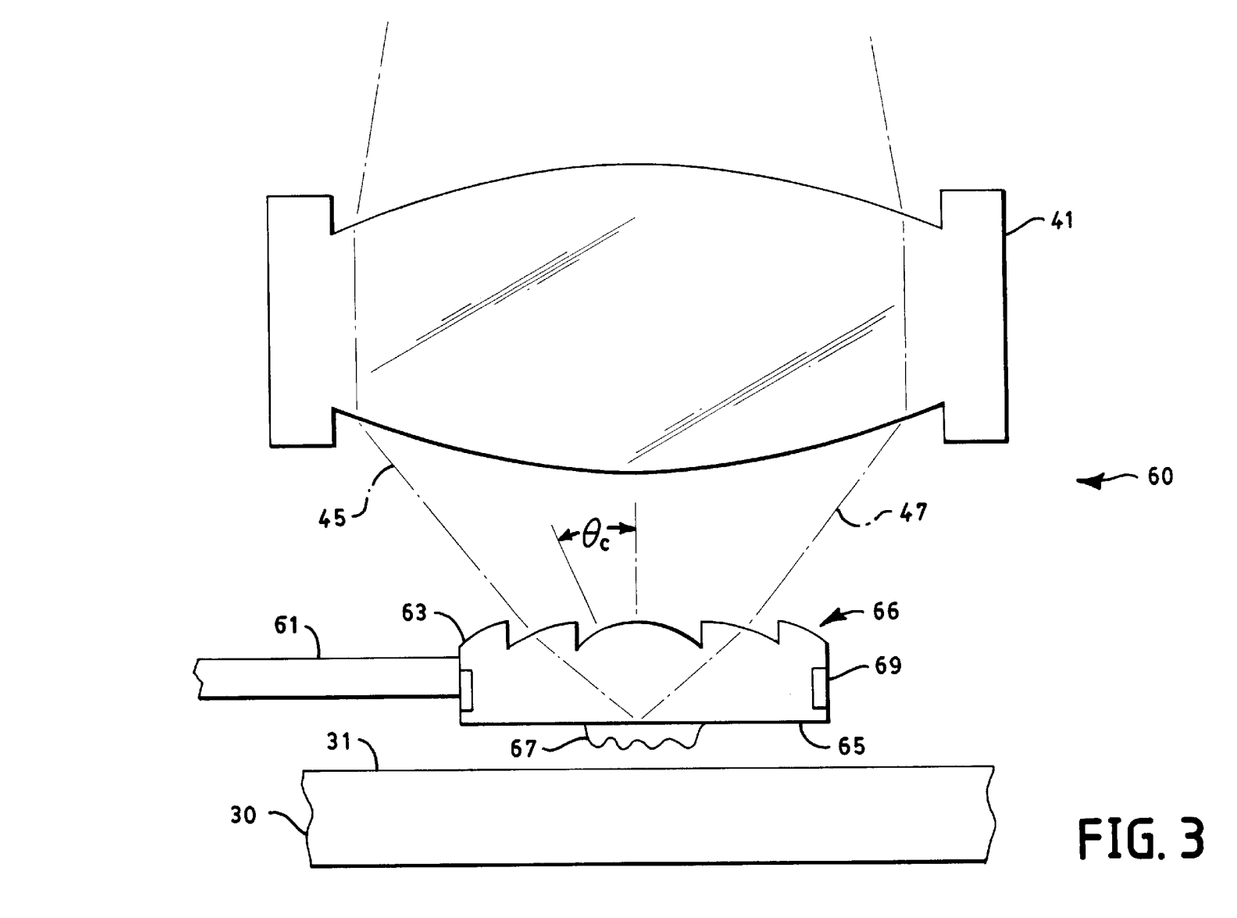
FIG. 3 is a diagrammatic elevational view of an optical data storage and retrieval system in accordance with the present invention showing placement of a diffractive near-field optical element adjacent an optical storage medium, wherein the method of detecting and producing optical artifacts in the optical storage medium is by means of an evanescent field.
Figure 4:
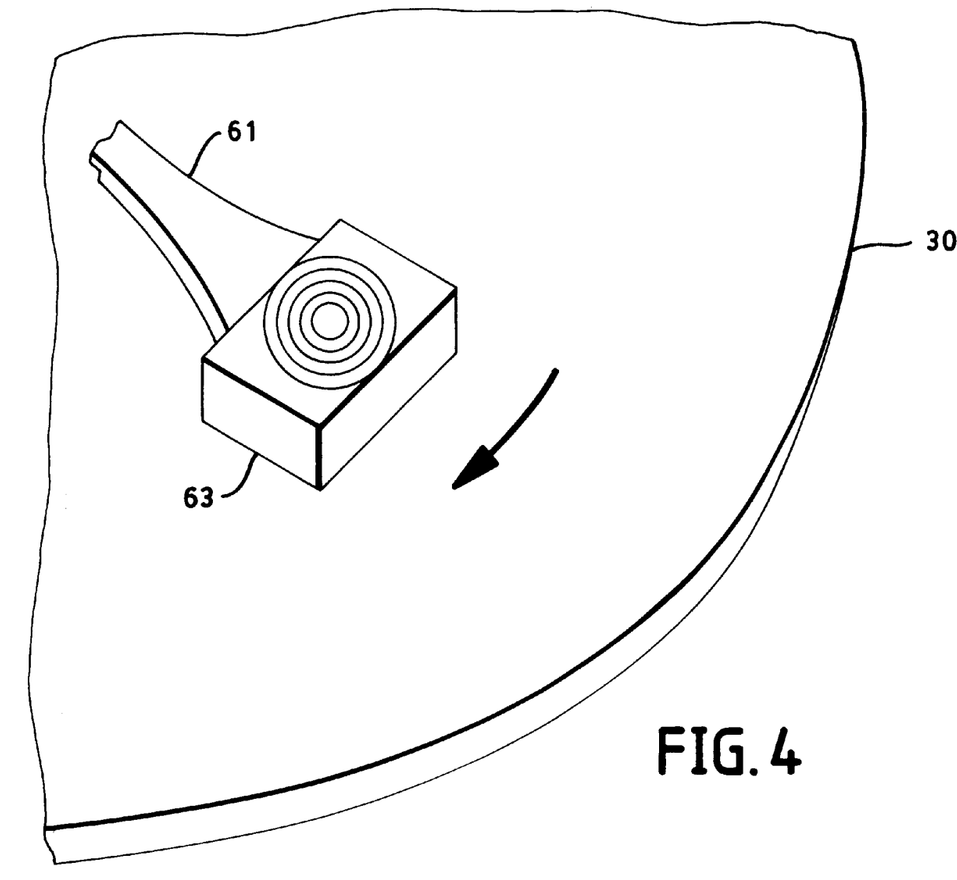
FIG. 4 is a diagrammatic perspective view of the diffractive near-field optical element of FIG. 3.
Figure 14:
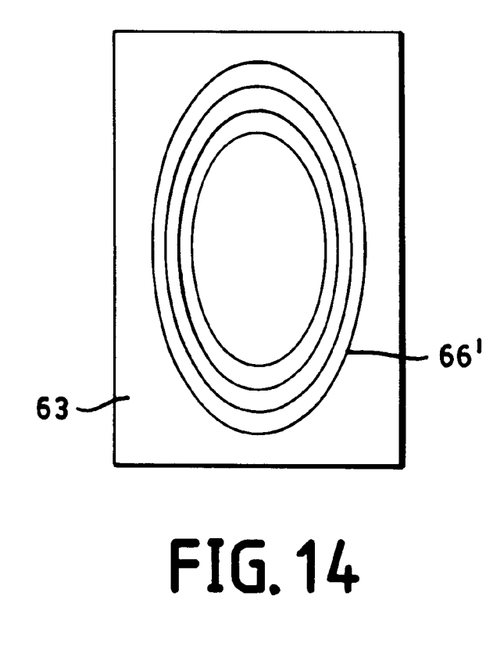
FIG. 14 is an alternative embodiment of the diffractive near-field optical element of FIG. 4, showing an anamorphic optical geometry.

There is shown in FIGS. 3 and 4 a first embodiment of an optical system 60 in accordance with the present invention. Optical system 60 comprises objective lens 41 and diffractive near-field optical element 63 (shown here in cross-sectional profile). Diffractive near-field optical element 63 is typically part of a "flying optical head" assembly, as well known in the relevant art. Diffractive near-field optical element 63 comprises a diffractive surface 66 in the form of Fresnel zone plates. The optical geometry of diffractive surface 66 is such that diffractive near-field optical element 63 is the optical equivalent of an aplanatic sphere. Diffractive near-field optical element 63 has a focal point at an internal total reflection surface 65. Diffractive surface 66 directs illumination 45 to internal total reflection surface 65 at beyond the critical angle, thereby forming an evanescent or near-field at surface 65. Diffractive surface 66 may have circular symmetry, as best seen in FIG. 4, or diffractive near-field optical element 63 may comprise a diffractive surface 66' having an anamorphic geometry, or an elliptical symmetry, as shown in FIG. 14, for applications in which, for example, there is a need for optical correction of illumination 45.

Illumination 45 of wavelength λ enters diffractive near-field optical element 63 at an angle greater than the critical angle $\theta_C$ and is totally internally reflected from reflection surface 65 as reflected radiation 47. Critical angle $\theta_C$ is determined by the relationship $\sin\theta_C = n_2/n_1$, where $n_1$ is the index of refraction of the ambient medium, typically air, and $n_2$ is the index of refraction of the material comprising diffractive near-field optical element 63. An evanescent field 67 is formed at reflection surface 65 by virtue of the total internal reflection of illumination 45.

Evanescent field 67 has an amplitude that decays exponentially with distance from reflection surface 65. The strength of available evanescent field 67 is given by:

$$E_{evanescent} = E_0 e^{\left(-\frac{z}{d_p}\right)} \quad (1$$

where $E_0$ is the phase dependent amplitude of the electric field associated with the photon in the medium comprising diffractive near-field optical element 63 and, $d_p$, is the penetration depth in the less dense medium at which $E_0$ decreases to $E_0/e$ and where:

$$d_p = \frac{\lambda_1}{2\pi(\sin^2\theta - n_{21}^2)^{\frac{1}{2}}} \quad (2$$

and $\lambda_1$ is the wavelength in the denser medium, θ is the incidence angle, and $n_{21}$ in the ratio of denser to lower indices of refraction at the boundary surface 32. The actual penetration depth, where $E_{evanescent}$ falls to the limit of detectability, is dependent on these variables as well as both the sensitivity of detector 15 and the optical properties of diffractive near-field optical element 63, and is typically approximately 0.75. As is well known in the relevant art, evanescent field 67, however small in intensity, can exist sensibly for tens of wavelengths, if the parameters in equation (2) are optimized. Evanescent field 67 has electromagnetic field vectors in all spatial directions, so that coupling is made to dipoles in any spatial orientation.

Diffractive near-field optical element 63 is retained in position above optical storage medium 30 by means of a supporting structure 61. For near-field operation, reflection surface 65 is maintained at within a wavelength λ of medium surface 31 for detection of optical artifacts in medium surface 31 by means of evanescent field 67. During operation, optical surface 31 is moved relative to diffractive near-field element 63, typically in a circular path as indicated by the arrow in FIG. 4, but another scanning path, such as rectilinear or other linear motion, may also be used. By using incident illumination 45 of greater intensity than is provided for the detection of optical artifacts, optical system 60 can be used to produce optical artifacts in medium surface in applications such as data recordation, for example.

Figure 5:
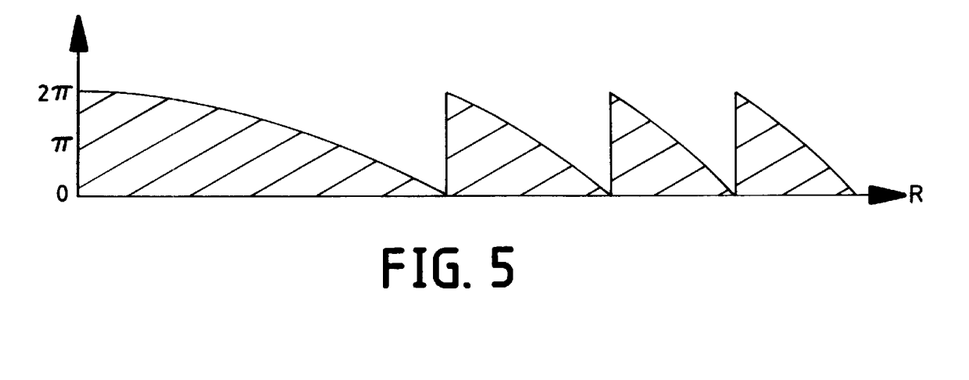
FIG. 5 is a graph of phase depth as a function of radial distance for the Fresnel zone plate structure of the diffractive near-field optical element of FIG. 3.
Figure 6:
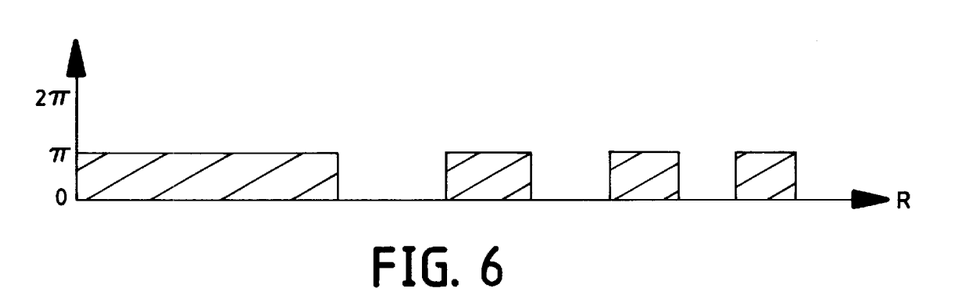
FIG. 6 is a graph of phase depth as a function of radial distance for an alternative binary diffraction grating structure for the diffractive near-field optical element of FIG. 3.

Diffractive near-field element 63 comprises optically-transparent circular zones having phase depth attributes varying with radial distance from the center of diffractive near-field element 63. The Fresnel zone plate distribution of diffractive surface 66 is represented by the graph of FIG. 5, in which is provided the phase depth value as a function of radius. This surface geometry can also be approximated by a binary surface configuration, for example, represented by the graph of FIG. 6. A binary surface is more easily fabricated than diffraction surface 66 comprising Fresnel zone plates, but is only about 40% as efficient. A simple binary diffractive lens, or phase-reversal zone plate, comprises transparent circular zones, half with a height differential that results in a change in the incident light of half the wavelength, λ/2. The amount of light transmitted by such a lens is four times that of an amplitude zone plate comprising alternating opaque and transmissive zones. In either case, the light is focused by diffraction at the zones, rather than by refraction as in a conventional lens. The zone plate equation is:

$$R^2_M = MF\lambda \tag{3}$$

where $R_M$ is the radius of the Mth circle, M is the number of total zones (1,2,3, ... M) or the number of a particular zone, F is the effective focal length of the lens, and λ is the wavelength of illumination 45.

As an illustrative example, consider a flying optical head, or "slider," made from diamond material with refractive index 2.4 and physical thickness 3,000 microns (3 mm), such as used in a DVD system, with illumination wavelength λ of approximately 0.630 microns. To achieve a near-field configuration, the illumination is incident to the distal flying surface at greater than the critical angle for diamond and air. Thus, for a value of 3,000 microns for F, a value of 6,000 microns for $R_M$ is more than adequate to exceed the critical angle. The number of zones is obtained from equation (3) is:

$$M = (6,000)^2/(3,000)(0.63) = 19,047 \text{ zones} \tag{4}$$

The width of the $M^{th}$ zone is found by subtracting the $(M-1)^{th}$ zone radius from the $M^{th}$ zone radius to give 0.16 microns. A feature of this size is quite practical with today's technology in mastering and replication.

The efficiency of such a binary or two-level diffractive optic is low, on the order of 40%, because the square wave grating directs light into the +1 and −1 diffractive orders equally. A theoretical 100% efficient diffraction lens can be obtained by making each of the zones into a sawtooth profile, also known and familiar as a Fresnel zone plate, shown in FIG. 5. Such structures are now attainable by direct write methods with electron-beam and ion beam milling, for example. A controlled dose resist loss method is used, typically, with the electron beam. While mastering such structures is expensive, the master is then replicated in nickel and the cost is amortized over many low cost replicated parts made from the nickel replica.

Fresnel zone plates can be approximated, however, with a series of multi-level zone steps. The efficiency increases as the number of levels is increased. This is essentially a blazing technique. Although the masks used in the photolithography are more simple than for the sawtooth profile, they have additional zones and have to be aligned carefully with each exposure and process. Each mask has twice the number of zones as the previous mask. Four masks result in $2^4$ levels and a first order diffraction efficiency of of 99%. Such structures are within the realm of possibility for today's improved semiconductor fabrication techniques, UV lasers or X-ray sources, and improved stepper and alignment techniques.

Efficiency is also determined by the relief depth of the diffractive optics structure. For a binary two-level diffractive optic, the efficiency E is:

$$E = [(2/\pi)\sin(\pi x/2\lambda)]^2 \tag{5}$$

where x is the depth, peak to valley, of the diffractive structure. Typically, the first order efficiency peaks when the depth is equal to the wavelength.

Figure 7:
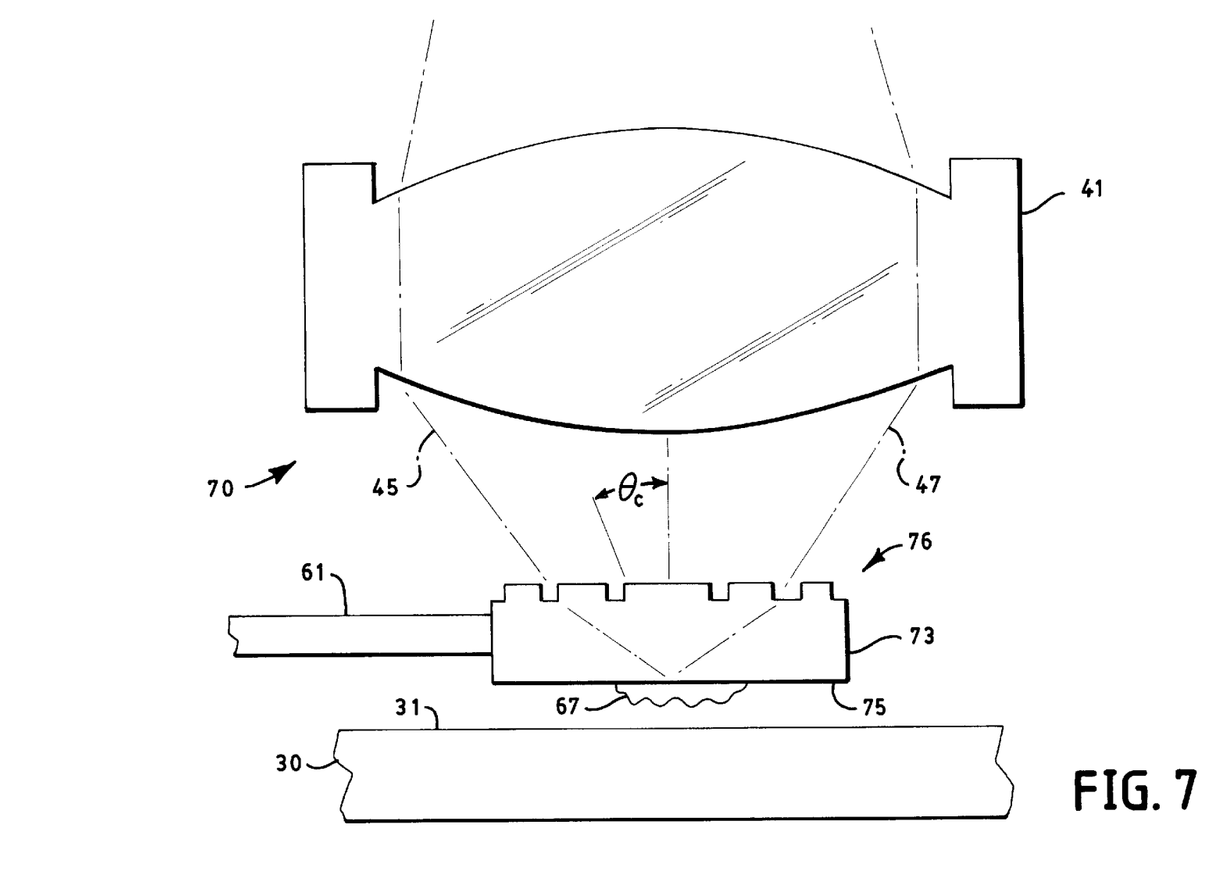
FIG. 7 is a diagrammatic elevational view of the optical data storage and retrieval system of FIG. 3 wherein the diffractive near-field optical element comprises a binary diffractive surface in accordance with the grating structure represented by FIG. 6.

FIG. 7 shows an optical system 70, in accordance with the present invention, comprising objective lens 41 and a binary diffractive near-field optical element 73. Illumination 45 enters a binary diffraction grating 76 at an angle greater than the critical angle $\theta_C$ and is totally internally reflected from a reflection surface 75 as reflected radiation 47. Evanescent field 67 is formed at reflection surface 75 for use in detection or recording from medium surface 31.

Figure 8:
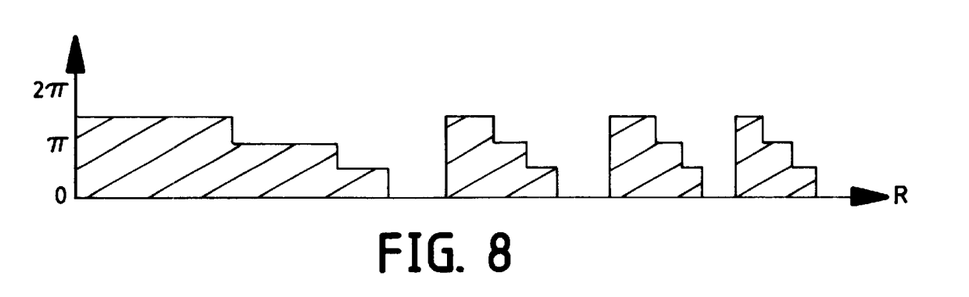
FIG. 8 is a graph of phase depth as a function of radial distance for yet another alternative multilevel diffraction grating structure for the diffractive near-field optical element of FIG. 3.
Figure 9:
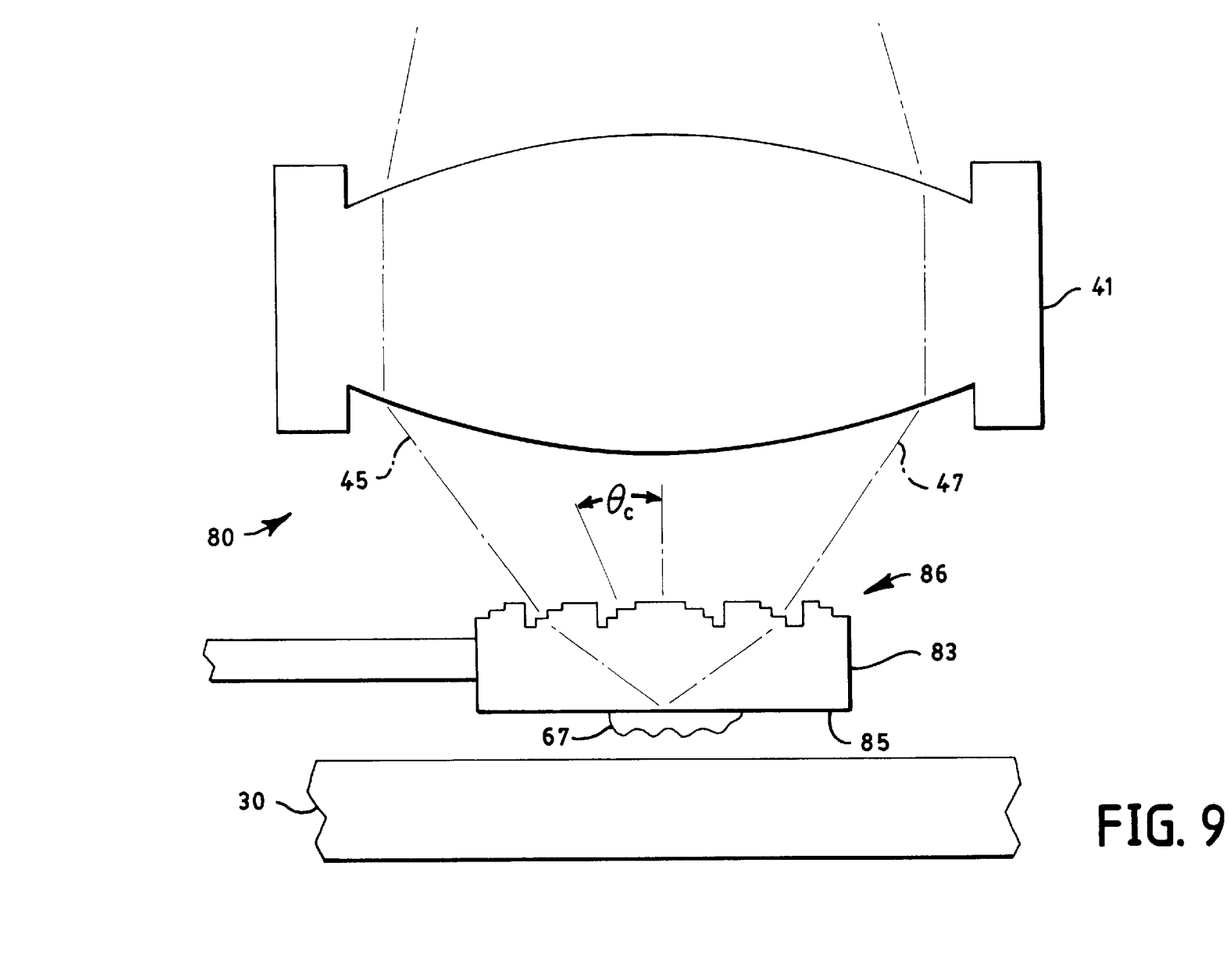
FIG. 9 is a diagrammatic elevational view of the optical data storage and retrieval system of FIG. 3 wherein the diffractive near-field optical element comprises a multilevel diffractive surface in accordance with the grating structure represented by FIG. 8.

Alternatively, diffractive surface 66 can be approximated by a multilevel zone plate configuration as represented by the graph of FIG. 8. An optical system 80 comprising a multilevel diffraction grating 86 in accordance with the present invention is shown in FIG. 9. A multilevel diffractive near-field optical element 83 receives illumination 45 and produces evanescent field 67 at optical medium 30. As in the embodiments above, illumination 45 is totally internally reflected at a reflecting surface 85 and redirected to objective lens 41 as reflected radiation 47. In comparison to binary diffraction near-field element 73 in FIG. 7, the efficiency of diffractive near-field element 83 is about 81%.

Figure 10:
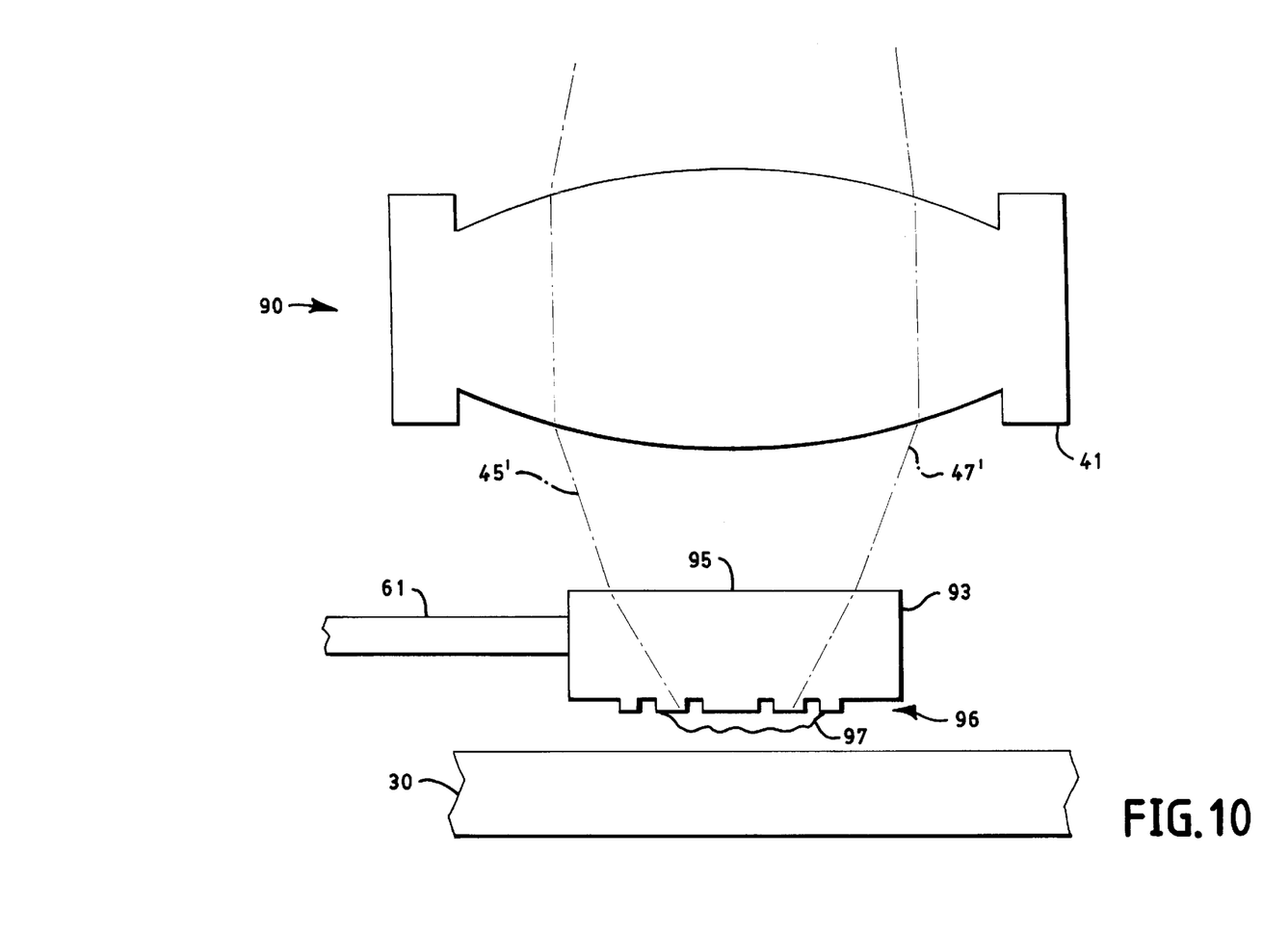
FIG. 10 is a diagrammatic elevational view of the optical data storage and retrieval system of FIG. 3 wherein the diffractive near-field optical element comprises a sub-wavelength diffraction grating.

In a further embodiment, shown in FIG. 10, an optical system 90 comprises objective lens 41 and a diffractive grating near-field optical element 93 in the optical path of a beam of illumination 45'. Illumination 45' passes through an optically-flat surface 95 and is incident upon a sub-wavelength diffraction grating 96. An evanescent field 97 is thus produced at sub-wavelength diffraction grating 97. In contrast to the embodiments described above, the angle of incidence of illumination beam 45' need not be greater than the critical angle $\theta_C$ for generation of evanescent field 97. Sub-wavelength diffraction grating 96 directly forms evanescent field 97 because the dimensions of sub-wavelength diffraction grating 96 are smaller than the wavelength λ of illumination 45'. Therefore, the diffracted orders are evanescent.

Figure 11:
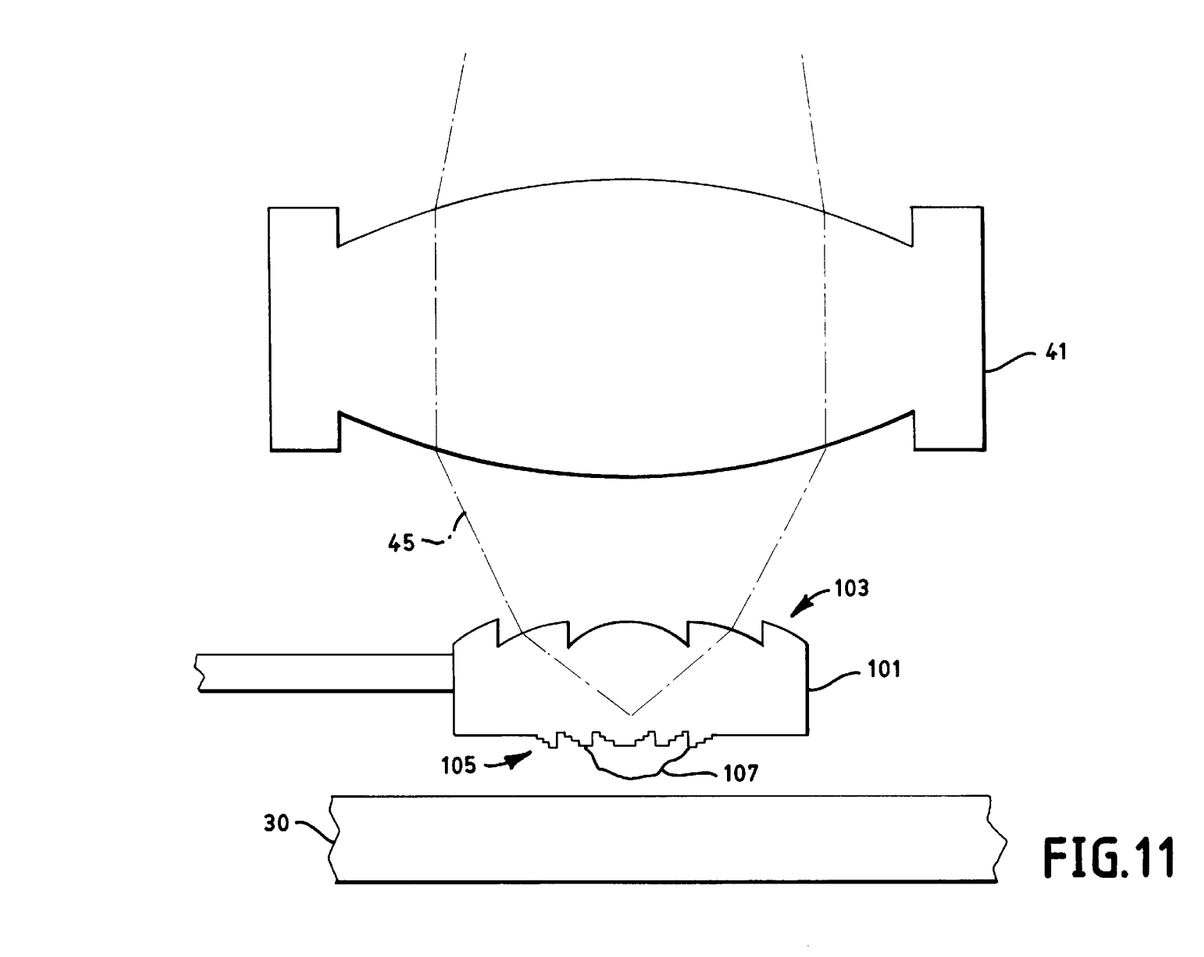
FIG. 11 is an alternative embodiment of the optical data storage and retrieval system of FIG. 10.

In an alternative embodiment, shown in FIG. 11, an optical system 100, in accordance with the present invention, comprises objective lens 41 and a modified diffractive grating near-field optical element 101 comprising a diffractive surface 103 and a sub-wavelength diffraction grating section 105. Diffraction surface 103 serves to direct illumination beam 45' onto sub-wavelength diffraction grating section 105 to produce an evanescent field 107.

Figure 12A:
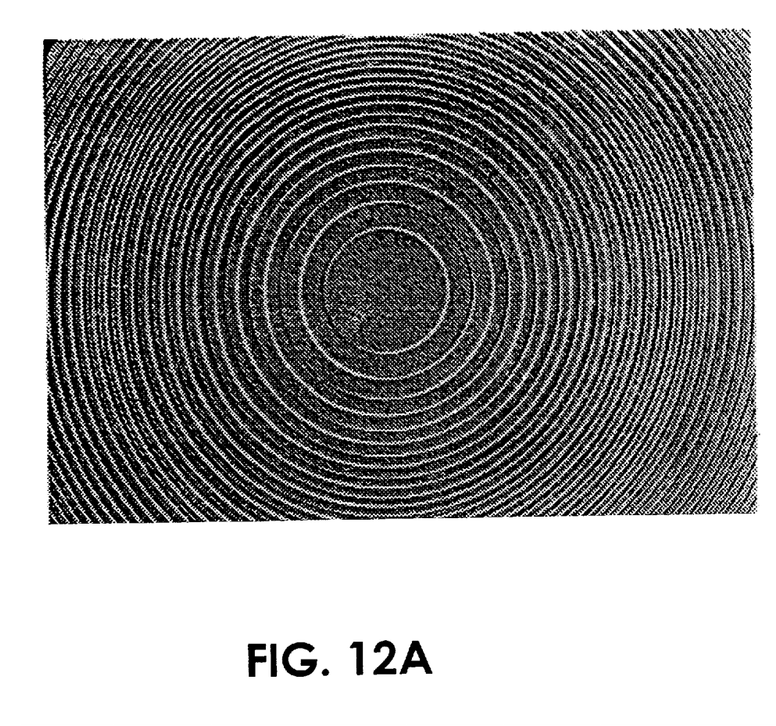
FIGS. 12A and 12B are photomicrographs of a two-level (i.e., binary) diffraction grating and its cross section, respectively, fabricated for use in accordance with the present invention.
Figure 12B:
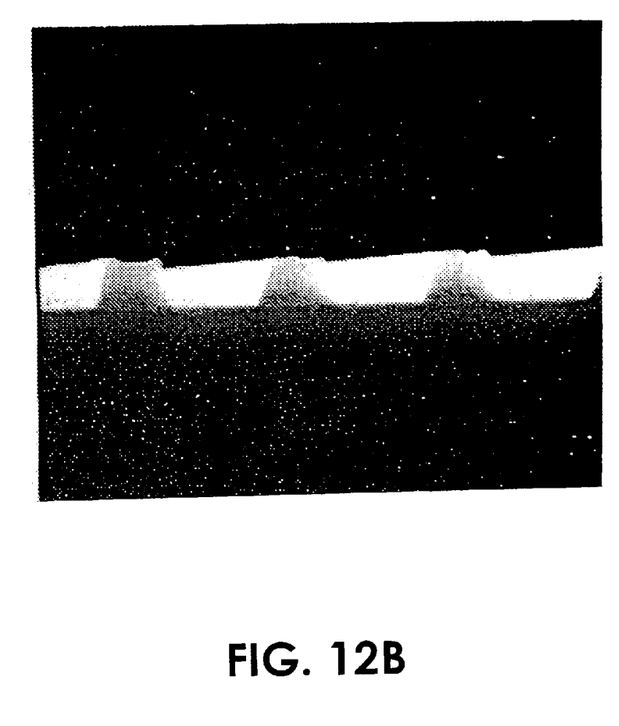
Figure 13:
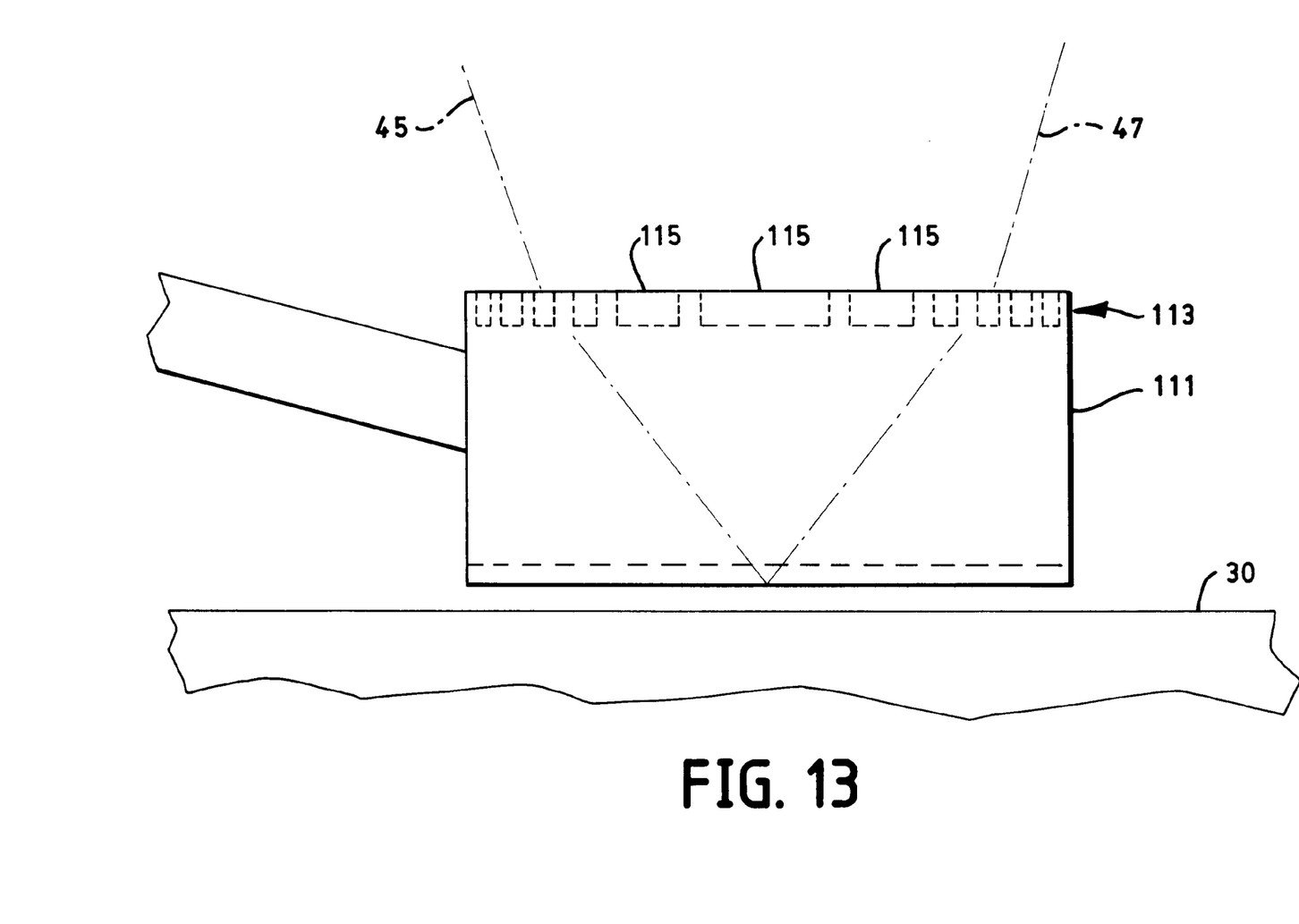
FIG. 13 is a diagrammatical elevational view of a diffractive near-field optical element fabricated by means of ion implantation.

By using diffractive optic or Fresnel equivalents in place of conventional steeply-curved optical elements, an optical system in accordance with the present invention can be made more easily and economically. For example, the binary, multilevel, or Fresnel diffractive surfaces can be formed by etching in accordance with conventional lithography techniques known to the microelectronics industry. Such techniques typically include the steps of coating an appropriate substrate with photoresist, irradiating the photoresist with patterned light to form the diffractive surface configuration, developing, and baking the photoresist. One of either the exposed photoresist or the unexposed photoresist is removed with a solvent and the uncovered portion of the substrate is etched, the substrate then sectioned into the individual diffractive optical component pieces. In this manner, many diffractive optical components can be fabricated at the same time in a single process, with uniformity and precision among the pieces. In addition, the irradiating pattern is easily controlled and can thus produce a diffractive optical component having aspheric, anamorphic, or other optical properties that are more difficult to produce in glass material using conventional fabrication techniques. An example of such a two-level (i.e., binary) diffraction grating is provided in the photomicrographs of FIG. 12. In an alternative method of fabrication, a a binary diffractive near-field optical element 111, shown in FIG. 13, comprises a diffractive surface 113 in which the grating structure is formed by regions 115 of ion implantation.

Multi-level diffractive gratings, which are desired for their higher efficiency, are produced with a repeat etch process with additional masks for each level. Fresnel optics may be made in a similar process except the resist is not binary and the pattern has grayscale variations, so that the etched topography has slopes.

For greater efficiency in fabrication, a master die can be fabricated using the process described above. The surface of the master die can be replicated in a material suitable for stamping or compression molding, such as nickel on stainless steel. The replication can then be used to press the diffractive or Fresnel optic structure into a compressible material, such as certain semiconductor glasses. This approach is viable because of the relatively small relief depths involved.

Moreover, the entire mounting and diffractive optic can be fabricated as an integral unit, where the required spring constant is achieved by etching the mounting material to the proper thickness. This again reduces the cost to assemble and manufacture, while also resulting in a higher performance and reliability product. If desired, detectors and circuits can be integrated into the mounting and diffractive optic assembly in this way. The diffraction or Fresnel lens can also be part of a conic body as well, which is then inserted into a suitable receiver head/slider carrier. In this way a ceramic or other typical slider material can be used.

Because a zone lens has multiple foci along the optical axis, corresponding to different wavelengths, this feature can be used to advantage in a ROM system with a tunable light source or white light source to read many levels of data in an optical medium at the same time. It can also be used in a writing system with multiple laser diode sources of different wavelengths, all sharing the same optics. Or, one level may be dedicated to the servo tracking task, thereby freeing up additional areas for writing data in the data level.

Figure 15:
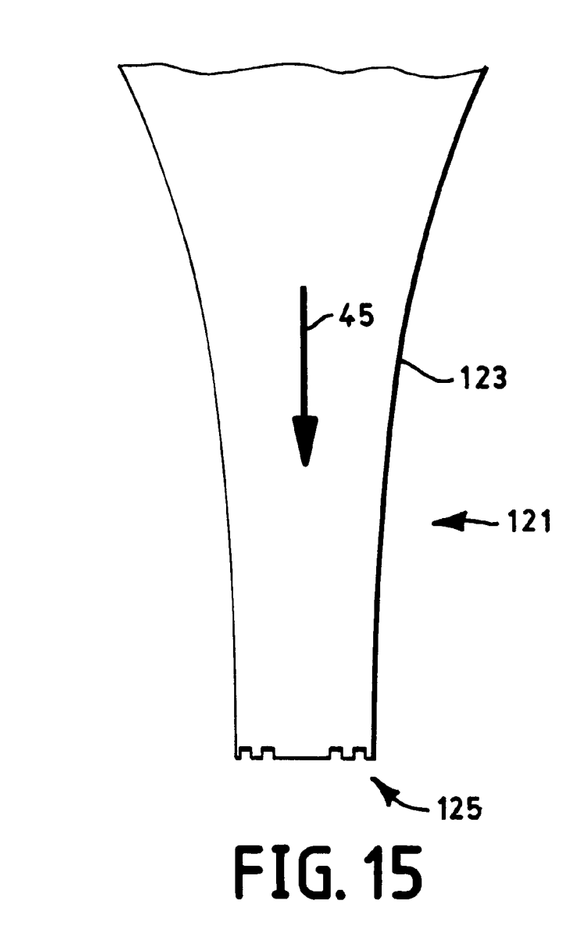
FIG. 15 shows a scanning probe comprising a diffractive surface element at the tip.

In another embodiment of the present invention, there is shown in FIG. 15 a diffractive near-field optical element 121 suitable for application as a scanning probe. Diffractive near-field optical element 121 comprises a waveguide, such as a tapered optical fiber 123 terminating in a diffractive optical surface, here shown as a binary diffraction grating 125.

Figure 16:
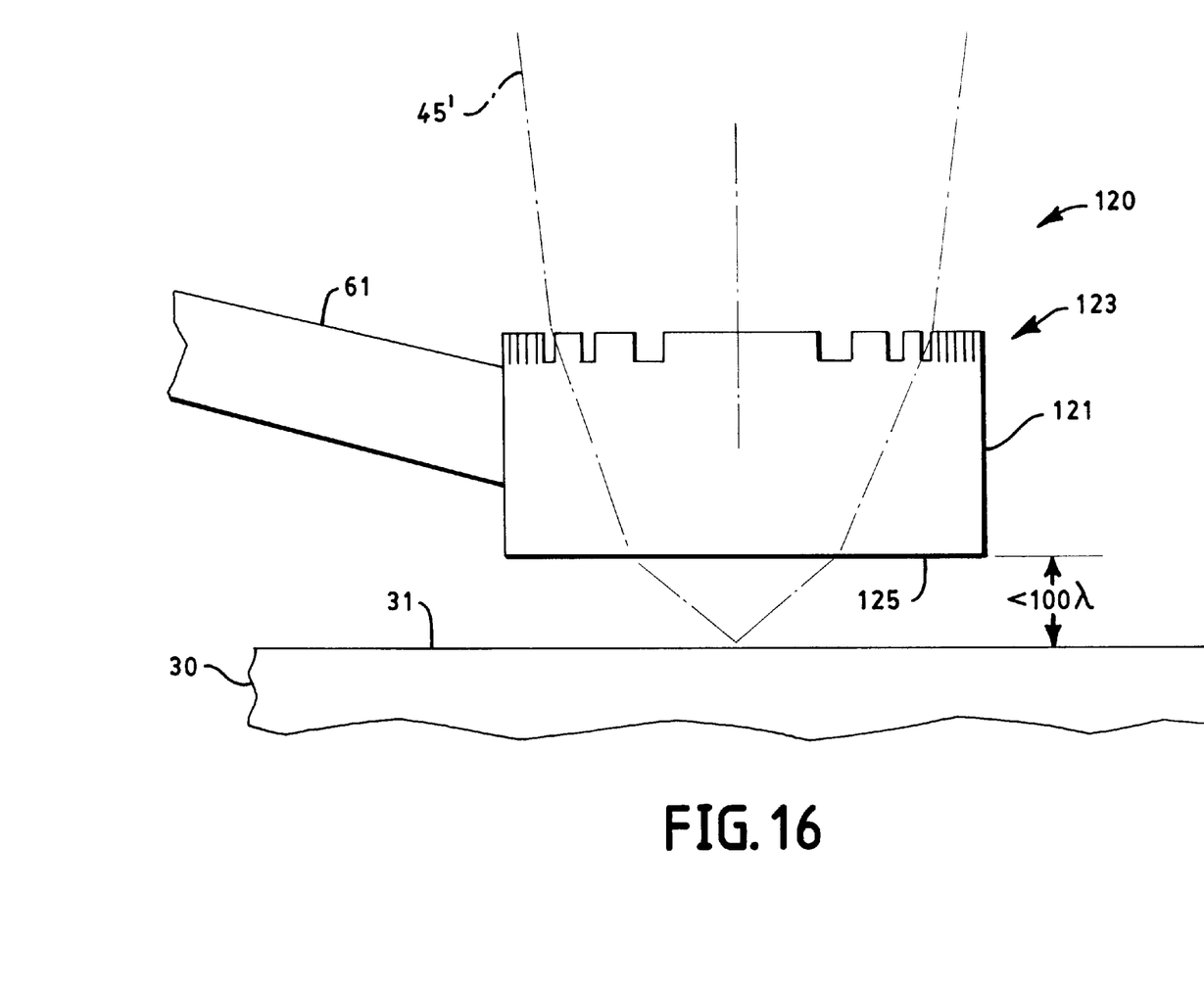
FIG. 16 shows an alternative embodiment to the embodiments of FIGS. 3, 7, 9, and 11 wherein the method of detection and production of optical artifacts is by means of propagating radiation; and, FIG. 17 shows an alternative embodiment of an optical data storage and retrieval system, an infinity conjugate system, in accordance with the present invention.

In a further embodiment of the present invention, there is shown in FIG. 16 an optical system 120 comprising diffractive near-field optical element 121 in which a diffractive surface 123 is configured such that the focal point of diffractive near-field optical element 121 lies beyond a lower surface 125. In optical system 120, the angle of incidence of illumination 45' need not be greater than the critical angle $\theta_C$. Accordingly, there is produced no evanescent field at lower surface 125 and propagating radiation is used for detection and production of optical artifacts. Preferably, lower surface of diffractive near-field optical element 121 is maintained at a distance from medium surface 31 of less than about one hundred wavelengths (100 $\lambda$).

One advantage of a flying optical head, whether used with an evanescent field or with very close propagating radiation, is that the air-bearing is constant in height so that no focus is required and no focus servo is used. However, this is true only if the laser diode and detector are integrated into the flying optical head. While such an approach is possible, there results added cost and weight, which slows down the head actuation response as there is more mass to be moved. If a conventional objective lens, such as a DVD lens, is used in conjunction with the flying optical head, then a focus servo is once again required because as the separation between the flying optical head and the objective lens varies, the converging beam from the objective lens becomes defocused. Connecting the objective lens to the flying optical head could eliminate the need for focus, but would make for a very cumbersome head which is very slow to respond to actuation.

Figure 17:
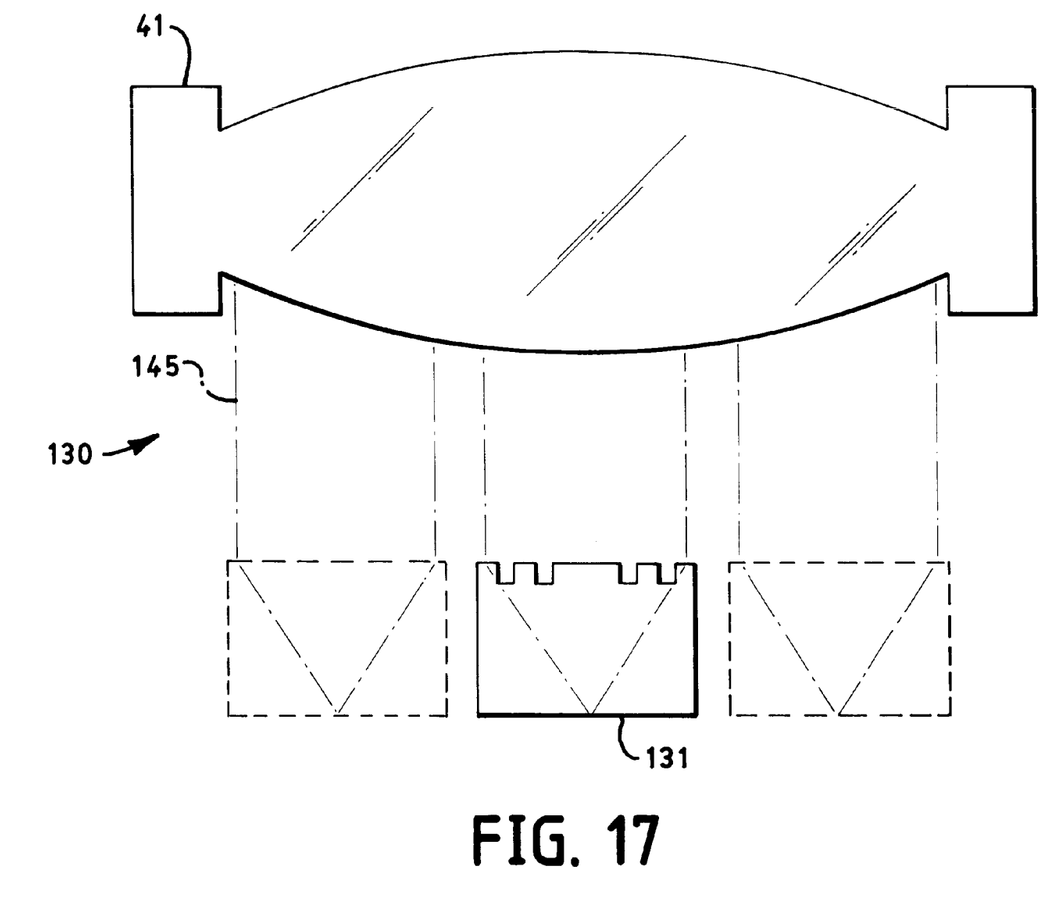

One solution is to make the optical system an infinity conjugate system 130, similar to that shown in FIG. 17. Objective lens 41 is used at infinity conjugates so that illumination 145 incident upon a diffractive near-field optical element 131 is collimated rather than converging. In this way, the separation between diffractive near-field optical element 131 and objective lens 41 can vary without changing focus, and no focus servo is needed. The other advantage of an infinity conjugate system is that the collimated light path allows opportunity to insert any number of optical devices such as wavelength filters, optical phase plates, beamsplitters, and so on without distorting the optics. Further, the source of illumination and the detector (not shown) are remotely disposed rather than integrated with diffractive near-field optical element 131.

In addition to the reading and writing of optical data, other applications for the super-resolution spot obtained with a diffractive near-field optic system include: 1) microscopy; 2) scanning near-field probe microscopy; 3) lithography, as in machining sub wavelength linewidths; 4) micro-machining (e.g., laser scalpels in medical research and surgery); and 5) laser printers for high-resolution computer, medical, and graphic arts.

While the invention has been described with reference to particular embodiments, it will be understood that the present invention is by no means limited to the particular constructions and methods herein disclosed and/or shown in the drawings, but also comprises any modifications or equivalents within the scope of the claims.

What is claimed is:

1. An optical assembly suitable for use with an optical medium for the storage and retrieval of data, said optical assembly comprising:

illumination means for providing a beam of optical radiation of wavelength $\lambda$;

an optical path that said beam of optical radiation follows; and, a diffractive optical element disposed in said optical path, said diffractive optical element having a first surface and a second surface, said first surface comprising a Fresnel zone plate positioned to receive at least a portion of said directed beam of radiation and further directing said portion to said second surface, said second surface disposed between said first surface and the optical medium to receive at least a portion of said portion, said second surface comprising a Fresnel diffractive grating having dimensions that are smaller than said wavelength $\lambda$ such that said Fresnel diffractive grating directly forms an evanescent field at said second surface.

2. An optical assembly suitable for use with an optical medium for the storage and retrieval of data, said optical assembly comprising:

illumination means for providing a beam of optical radiation of wavelength $\lambda$;

an optical path that said beam of optical radiation follows; and, a diffractive optical element disposed in said optical path, said diffractive optical element having a first surface and a second surface, said first surface comprising a series of multi-level zone steps positioned to receive at least a portion of said directed beam of radiation and further directing said portion to said second surface, said second surface disposed between said first surface and the optical medium to receive at least a portion of said portion, said second surface comprising a Fresnel diffractive grating having dimensions that are smaller than said wavelength $\lambda$ such that said Fresnel diffractive grating directly forms an evanescent field at said second surface.

3. An optical assembly suitable for use with an optical medium for the storage and retrieval of data, said optical assembly comprising:

illumination means for providing a beam of optical radiation of wavelength $\lambda$;

an optical path that said beam of optical radiation follows; and, a diffractive optical element disposed in said optical path, said diffractive optical element having a first surface and a second surface, said first surface comprising a phase-reversal zone plate positioned to receive at least a portion of said directed beam of radiation and further directing said portion to said second surface, said second surface disposed between said first surface and the optical medium to receive at least a portion of said portion, said second surface comprising a Fresnel diffractive grating having dimensions that are smaller than said wavelength $\lambda$ such that said Fresnel diffractive grating directly forms an evanescent field at said second surface.

4. An optical assembly suitable for use with an optical medium for the storage and retrieval of data, said optical assembly comprising:

illumination means for providing a beam of optical radiation of wavelength $\lambda$;

an optical path that said beam of optical radiation follows; and, a diffractive optical element disposed in said optical path, said diffractive optical element having a first surface and a second surface, said first surface comprising a diffractive grating having circular symmetry positioned to receive at least a portion of said directed beam of radiation and further directing said portion to said second surface, said second surface disposed between said first surface and the optical medium to receive at least a portion of said portion, said second surface comprising a Fresnel diffractive grating having dimensions that are smaller than said wavelength $\lambda$ such that said Fresnel diffractive grating directly forms an evanescent field at said second surface.

5. An optical assembly suitable for use with an optical medium for the storage and retrieval of data, said optical assembly comprising:

illumination means for providing a beam of optical radiation of wavelength $\lambda$;

an optical path that said beam of optical radiation follows; and, a diffractive optical element disposed in said optical path, said diffractive optical element having a first surface and a second surface, said first surface comprising a diffractive grating having elliptical symmetry positioned to receive at least a portion of said directed beam of radiation and further directing said portion to said second surface, said second surface disposed between said first surface and the optical medium to receive at least a portion of said portion, said second surface comprising a Fresnel diffractive grating having dimensions that are smaller than said wavelength $\lambda$ such that said Fresnel diffractive grating directly forms an evanescent field at said second surface.

6. An optical assembly suitable for use with an optical medium for the storage and retrieval of data, said optical assembly comprising:

illumination means for providing a beam of optical radiation of wavelength $\lambda$;

an optical path that said beam of optical radiation follows; and, a diffractive optical element disposed in said optical path, said diffractive optical element having a first surface and a second surface, said first surface comprising a diffractive zone plate positioned to receive at least a portion of said directed beam of radiation and further directing said portion to said second surface, said second surface disposed between said first surface and the optical medium to receive at least a portion of said portion, said second surface comprising a Fresnel diffractive grating having dimensions that are smaller than said wavelength $\lambda$ such that said Fresnel diffractive grating directly forms an evanescent field at said second surface.

7. The optical assembly of claim 6 wherein at least one surface of said diffractive optical element is formed in accordance with lithographic techniques.

8. The optical assembly of claim 6 wherein at least one surface of said diffractive optical element comprises regions of ion implantation.

9. The optical assembly of claim 6 wherein at least one surface of said diffractive optical element is formed by stamping.

10. The optical assembly of claim 6 wherein at least one surface of said diffractive optical element is formed by compression molding.

11. The optical assembly of claim 6 wherein at least one surface of said diffractive optical element is part of a conic body.

12. The optical assembly of claim 6 wherein said diffractive optical element includes an integral mounting, said integral mounting having a spring constant achieved by etching.

* * * * *